(12) United States Patent
Baykal et al.

(10) Patent No.: US 8,121,124 B2
(45) Date of Patent: Feb. 21, 2012

(54) APPLYING ADAPTIVE THRESHOLDS TO MULTICAST STREAMS WITHIN COMPUTER NETWORKS

(75) Inventors: Berkay Baykal, Westborough, MA (US); Shaun Noel Missett, Avon, CT (US); Matthew Kontoff, Acton, MA (US); Jeffrey Buffum, Bolton, MA (US)

(73) Assignee: Calix, Inc., Petaluma, CA (US)

( * ) Notice: Subject to any disclaimer, the term of this patent is extended or adjusted under 35 U.S.C. 154(b) by 269 days.

(21) Appl. No.: 12/485,475

(22) Filed: Jun. 16, 2009

(65) Prior Publication Data

US 2010/0316050 A1    Dec. 16, 2010

(51) Int. Cl.
*H04L 12/28* (2006.01)
*H04L 12/56* (2006.01)

(52) U.S. Cl. ...................................................... 370/390

(58) Field of Classification Search .......... 370/229–234, 370/235, 238, 351–356, 390, 432
See application file for complete search history.

(56) References Cited

U.S. PATENT DOCUMENTS

| | | | |
|---|---|---|---|
| 7,269,182 B1 | 9/2007 | Carrel et al. | |
| 7,289,501 B2 | 10/2007 | Davis | |
| 2002/0191628 A1* | 12/2002 | Liu et al. ...................... | 370/428 |
| 2004/0033075 A1 | 2/2004 | Koch et al. | |
| 2005/0232272 A1 | 10/2005 | Deng | |
| 2006/0146857 A1* | 7/2006 | Naik et al. ..................... | 370/432 |
| 2007/0280236 A1* | 12/2007 | Yang ............................. | 370/390 |
| 2008/0056293 A1* | 3/2008 | Robbins et al. ............... | 370/432 |
| 2009/0080328 A1* | 3/2009 | Hu et al. ........................ | 370/230 |
| 2009/0290585 A1* | 11/2009 | Deng ............................. | 370/390 |
| 2010/0202452 A1* | 8/2010 | Ram et al. ..................... | 370/390 |

FOREIGN PATENT DOCUMENTS

EP    0902569 A1    3/1999

OTHER PUBLICATIONS

Declaration Under 37 C.F.R. 1.132, 5 pgs., (signed by Matthew Kontoff on Oct. 15, 2010).
White Paper, "Introduction to IGMP for IPTV Networks-Understanding IGMP Processing in the Broadband Access Network," Juniper Networks, Inc., Oct. 2007, 12 pages.
RFC 2236, Internet Group Management Protocol, Version 2, Nov. 1997, 18 pages.
RFC 1112, Host Extensions for IP Multicasting, Aug. 1989, 17 pages.
RFC 3376, Internet Group Management Protocol, Version 3, Oct. 2002, 53 pages.

* cited by examiner

*Primary Examiner* — Ayaz Sheikh
*Assistant Examiner* — Blanche Wong
(74) *Attorney, Agent, or Firm* — Shumaker & Sieffert, P.A.

(57) ABSTRACT

In general, techniques are described for applying adaptive thresholds to multicast streams within computer networks. For example, an access node may implement the techniques to facilitate efficient delivery of multicast streams. The access node comprises an interface that couples to a subscriber network having a subscriber device. The access node also includes a control unit that determines a multicast stream count reflecting current delivery of multicast streams to the subscriber network and a threshold value based on historical multicast stream counts delivered to the subscriber. The interface receives a message requesting to join a multicast group in accordance with a multicast management protocol. In response to this message, the control unit determines a projected stream count based on the above current multicast count. The control unit then compares the projected stream count to the threshold value, and admits the subscriber device to the multicast group based on the comparison.

27 Claims, 6 Drawing Sheets

APPLYING ADAPTIVE THRESHOLDS TO MULTICAST STREAMS WITHIN COMPUTER NETWORKS

TECHNICAL FIELD

The disclosure relates to computer networks and, more particularly, communicating data within computer networks.

BACKGROUND

A service provider network typically comprises a number of different types of computer networks interconnected to one another. One type of network referred to as an access network enables subscriber devices, which may also be referred to as customer premises equipment (CPE), to access the service provider network. Subscriber devices or CPE may comprise set-top boxes (STBs), laptop computers, desktop computers, mobile devices (such as mobile cellular phones and so-called "smart phones"), Voice over Internet Protocol (VoIP) telephones, workstations, modems, wireless access points (WAPs), and other devices capable of accessing or otherwise facilitating access to the service provider network.

The access network typically comprises a number of access nodes, such as a Digital Line Subscriber Line Access Multiplexers (DSLAMs) or a Cable Modem Termination System (CMTS), that each manages access by one or more of the subscriber devices to the service provider network. The access node may, for example, multiplex traffic from subscriber devices into a composite signal and transmit this signal upstream to the subscriber network for delivery to one or more destinations. The access nodes may also manage multicast communications or streams to more efficiently utilize bandwidth of the access network between the access nodes and the subscriber devices.

For example, an access node may implement a multicast management protocol, such as an Internet Group Management Protocol (IGMP). IGMP provides a way to track subscriber device memberships in multicast groups. The subscriber devices may issue an IGMP join request to indicate to the access node that it has joined a multicast group. The access node may maintain a multicast group membership table that includes an entry for each multicast group currently subscribed to by at least one subscriber device. In response to the IGMP join request, the access node may update an entry in this table associated with the indicated multicast group to reflect the new membership by the subscriber device.

Likewise, the subscriber device may issue an IGMP leave request, indicating that the subscriber device has left a multicast group. The access node, in response to this leave request, may update the group membership table to reflect that the subscriber devices left the indicated group. Based on this table, the access node may determine whether one or more groups stored in the table is currently being subscribed to by more than one subscriber device. If no subscriber devices are subscribing to a particular multicast group, the access node may stop streaming or otherwise delivering the multicast content from this group to the subscriber devices, thereby more efficiently utilizing the bandwidth in the access network.

However, IGMP leave requests may be lost or corrupted before arriving at the access node, which may prevent access nodes from successfully determining whether or not any of the subscriber devices are still active members in the one or more multicast groups. This may result in bandwidth inefficiencies, as the access node may continue to deliver multicast streams even though none of the subscriber devices are members of the corresponding multicast group. To overcome this inefficiency, the access node may periodically issue an IGMP general query to the subscriber devices, which may respond with an IGMP report detailing the one or more multicast groups to which each of the subscriber devices is currently a member. Based on these reports, the access node may determine whether to continue streaming the multicast content for all or a subset of the groups listed in the multicast group membership table. In this manner, IGMP provides a failsafe to overcome bandwidth inefficiencies resulting from lost or corrupted IGMP leave requests.

SUMMARY

In general, techniques are described in this disclosure for applying multicast stream threshold within computer networks. More particularly, an access node coupled to a subscriber network may implement the techniques to determine a threshold value based on data that specifies previously delivered multicast streams to a given subscriber network. The access node may determine the threshold value as a moving average of the number of multicast streams delivered for the given subscriber networks or as a maximum or local maximum of the number of multicast streams previously delivered to the given subscriber network. In this sense, the techniques may enable the access node to heuristically determine an adaptive threshold based on previous experiences, e.g., data collected regarding past delivery of multicast streams. Using this threshold may substantially reduce the number and/or frequency of periodic general query messages sent to detect a lost leave request, which may enable recovery of misused bandwidth more quickly by removing unnecessary multicast streams from being delivered to the subscriber.

For example, the access node may determine the threshold value and a current number of multicast streams being delivered to the subscriber network. In response to receiving a join request from a subscriber device of the subscriber network, the access node may determine a projected stream count by adding one to the current number of multicast streams. The access node may then compare the projected stream count to the threshold value and, based on this comparison, issue a general query message in order to detect a lost leave request. In one aspect, the access node may only issue a general query message if the projected stream count exceeds the threshold value.

In this respect, the techniques may promote more efficient access node resource utilization by reducing consumption of resources (e.g., processor utilization, memory use, etc.) related to generating the general query and correlating responses received in response to the general query. Moreover, the techniques may better facilitate the increasing use of multicast streams to deliver television (TV) over the Internet, which is referred to an Internet Protocol TV (IPTV) service. Considering the large amount of bandwidth each channel of an IPTV service consumes, the techniques may provide for an adaptive threshold value that adapts to subscriber behavior such that the access node may not needless consume bandwidth with multicast management overhead, e.g., general query messages and responses. Moreover, by only issuing the general query message to the subscriber network when the projected stream count exceeds the threshold value, the techniques may detect lost leave messages when the current behavior seems erratic in view of past subscriber behavior to prevent inefficient bandwidth consumption.

In one embodiment, a method performed by an access node coupled to a subscriber network that includes a subscriber device, the method comprising determining, with the access node, a threshold value based on a number of multicast streams that the access node previously delivered simultaneously to the subscriber network and receiving, with the access node, a message requesting to join a first multicast group from the subscriber device. The method further comprising determining a projected stream count based on a current number of multicast streams currently being delivered to the subscriber network and a requested multicast stream associated with the join message, determining, with the access node, whether the projected stream count exceeds the threshold value and identifying one of the multicast streams currently being delivered to the subscriber network for which a leave message requesting to leave a second multicast group corresponding to this one of the multicast streams was not received by the access node based on the determination of whether the projected stream count exceeds the threshold value.

In another embodiment, an access node coupled to a subscriber network that includes a subscriber device comprises at least one interface that couples the access node to the subscriber network, wherein the at least one interface receives a message requesting to join a first multicast group from the subscriber device. The access node also comprises a control unit that determines a threshold value based on a number of multicast streams that the access node previously delivered simultaneously to the subscriber network, determines a projected stream count based on a current number of multicast streams currently being delivered to the subscriber network and a requested multicast stream associated with the join message, determining whether the projected stream count exceeds the threshold value, and identifies one of the multicast streams currently being delivered to the subscriber network for which a leave message requesting to leave a second multicast group corresponding to this one of the multicast streams was not received by the access node based on the determination of whether the projected stream count exceeds the threshold value.

In another embodiment, a system comprises a subscriber network that includes a subscriber device, a network device and an access node intermediately positioned between the subscriber network and the switch. The access node includes at least one interface that couples the access node to the subscriber network, wherein the at least one interface receives a message requesting to join a first multicast group from the subscriber device. The access node also includes a control unit that determines a threshold value based on a number of multicast streams that the access node previously delivered simultaneously to the subscriber network, determines a projected stream count based on a current number of multicast streams currently being delivered to the subscriber network and a requested multicast stream associated with the join message, determining whether the projected stream count exceeds the threshold value, and identifies one of the multicast streams currently being delivered to the subscriber network for which a leave message requesting to leave a second multicast group corresponding to this one of the multicast streams was not received by the access node based on the determination of whether the projected stream count exceeds the threshold value.

In another embodiment, a computer-readable medium comprising instructions for causing a programmable processor to determine a threshold value based on a number of multicast streams that an access node previously delivered simultaneously to a subscriber network that includes a subscriber device, receive a message requesting to join a first multicast group from the subscriber device, determine a projected stream count based on a current number of multicast streams currently being delivered to the subscriber network and a requested multicast stream associated with the join message, determine whether the projected stream count exceeds the threshold value, and identify one of the multicast streams currently being delivered to the subscriber network for which a leave message requesting to leave a second multicast group corresponding to this one of the multicast streams was not received by the access node based on the determination of whether the projected stream count exceeds the threshold value.

The details of one or more examples of the techniques described in this disclosure are set forth in the accompanying drawings and the description below. Other features, objects, and advantages of the techniques described in this disclosure will be apparent from the description and drawings, and from the claims.

DETAILED DESCRIPTION

Figure 1:
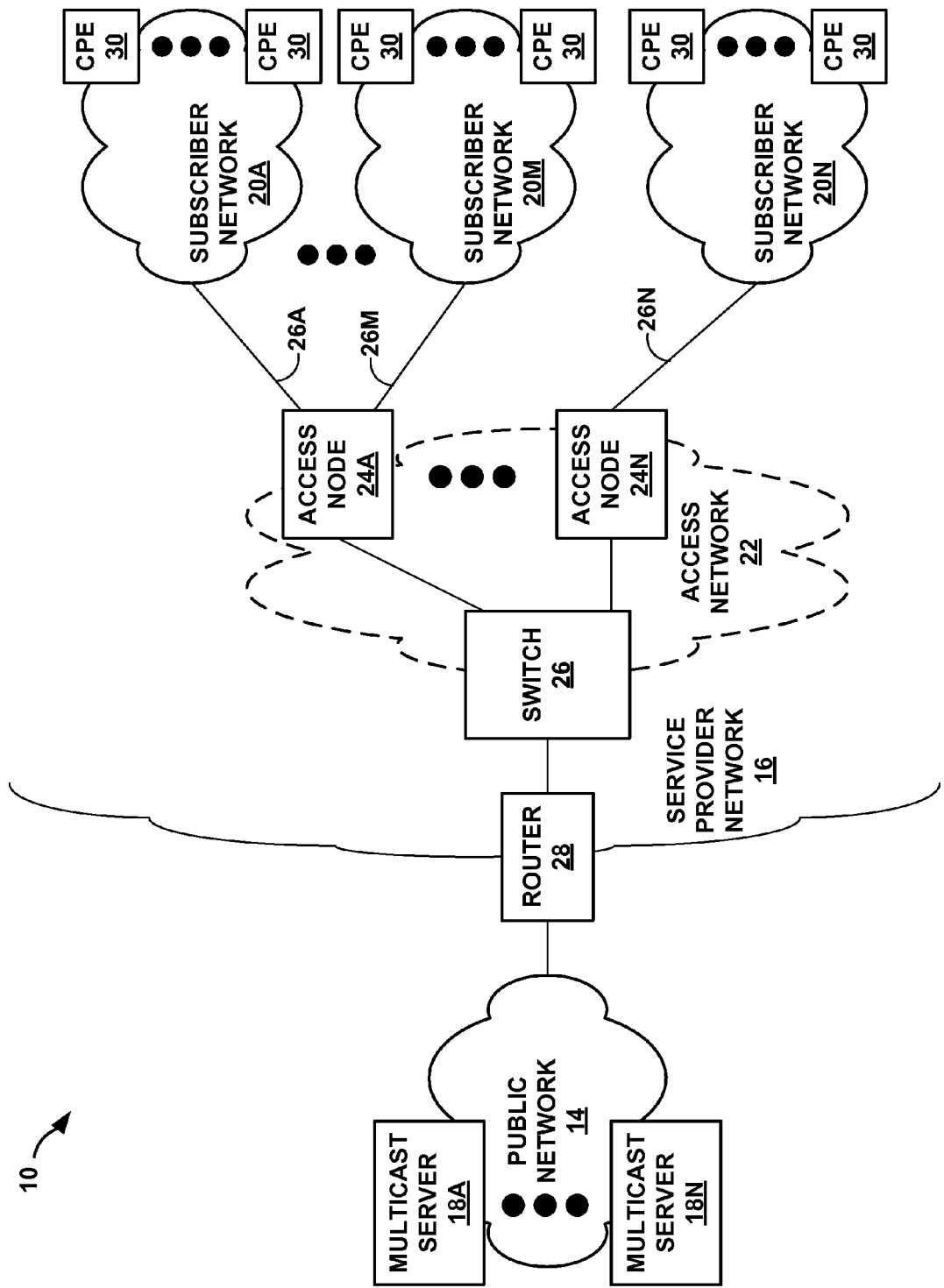
FIG. 1 is a block diagram illustrating an example network system in which one or more access nodes implement the techniques described in this disclosure.

FIG. 1 is a block diagram illustrating an example network system 10 in which one or more of access nodes 12A-12N implements the techniques described in this disclosure. While described with respect to a particular network system 10 and particular examples of network devices, e.g., access nodes 12A-12N ("access nodes 12"), the techniques may be implemented by any network device in any network system, where the network device manages delivery of multicast content or streams to other network devices. The techniques therefore should not be limited in any aspect to the various examples described in this disclosure.

In the example of FIG. 1, network system 10 includes a public network 14 and service provider network 16. Public network 14 typically comprises a packet-switched network that implements an Internet Protocol (IP). For this reason, public network 14 may be referred to as an IP packet-switched network. Also, considering that IP is a layer three (L3) protocol, where L3 refers to the third or network layer of the Open Systems Interconnection (OSI) model, public network 14 may be referred to as a L3 packet-switched network. An example public network 14 may comprise what is commonly referred to as the Internet or any other network that is generally accessible by the public.

In any event, public network 14 may comprise a plurality of interconnected network devices (not shown in FIG. 1) that communicate data in the form of IP packets between one another. These network devices may comprise web servers, application servers, data servers, print servers, routers, gateways, switches, hubs, workstations, desktop computers, laptop computers, mobile cellular phones (including so-called "smart phones"), personal digital assistants (PDAs), or any other device capable of accessing or facilitating access to public network 14, as well as, multicast servers 18A-18N

("multicast servers 18"). Multicast servers 18, as described in more detail below may comprise servers that store multicast content and host multicast groups for delivery of this multicast content as multicast streams to members of the multicast groups.

Service provider network 16 may comprise a network maintained and operated by a service provider. Typically, the service provider may operate service provider network 16 to facilitate access by subscriber networks, such as subscriber networks 20A-20N ("subscriber networks 20"), to public network 14. A subscriber who maintains and operates one of subscriber networks 20 may contract with the service provider for this so-called "network access." To facilitate this access, service provider network 16 may include a sub-network shown in FIG. 1 as access network 22.

Access network 22 may comprise a sub-network within service provider network 16 that facilitates access to service provider network 16 by subscriber networks 20. Access network 22 may include a plurality of access nodes 24A-24N ("access nodes 24") that couple via dedicated subscriber lines 26A-26N ("subscriber lines 26") to each of subscriber networks 20, respectively. Subscriber lines 26 are "dedicated" in that each of subscriber lines 26 connects one and only one of subscriber networks 20 to a respective one of access nodes 24 rather than connecting multiple ones of subscriber networks 20 to a respective one of access nodes 24.

When more than one of subscriber networks 20 is connected by a single one of subscriber lines 26 to a respective one of access nodes 24, the subscriber line is referred to as a "shared" subscriber line. However, even when shared, the subscriber line may be logically divided into dedicated virtual subscriber lines for each one of the subscriber networks sharing the line by way of, for example, a Virtual Local Area Network (VLAN) technique. For ease of illustration the techniques are described with respect to dedicated subscriber lines. Yet, the techniques may also be implemented with respect to shared subscriber lines and, as a result, the techniques should not be limited to the example described in this disclosure.

Access network 22 may, in one example, comprise a layer two (L2) network, where L2, much like L3 above, refers to the second or data link layer of the OSI model. An example L2 network may comprise an Ethernet network. Typically, network devices of L2 networks switch, rather than route as in L3 networks, data units (referred to as "frames" or sometimes "packets" in Ethernet networks) to one another. For this reason, access network 22 is shown with a dashed line to indicate that it may be distinct from service provider network 16 in that access network 22 may comprise a L2 network while service provider network 16 may generally comprise a L3 network.

Assuming for purposes of illustration that access network 22 represents a L2 network, access network 22 may include a switch 26 that switches data units to various ones of access nodes 24. Switch 26 may comprise a L2 network device that learns addresses associated with access nodes 24 and associates those addresses with particular ports on which switch 26 switches the data units to access nodes 24. Access nodes 24, in this example embodiment, may each comprise a Digital Subscriber Line Access Multiplexer (DSLAM) that multiplexes multiple signals received via respective subscriber networks 20 onto the single communication medium connecting access nodes 24 to switch 26.

While described herein with respect to a L2 network and L2 network devices for ease of illustration purposes, access network 22 may comprise a L3 or any other type of network, access nodes 24 may each comprise a L3 or any other type of network device and switch 26 may comprise a L3 or another other type of network device. For example, access network 22 may, in other examples, comprise a L3 packet-switched network, such as an IP network. Access nodes 24 may, in this example, comprise a Cable Modem Termination System (CMTS) or any other device that implements L3 network protocols. With respect to this example, switch 26 may route rather than switch network traffic and may represent a L3 network device referred to as a "router." Regardless, the techniques should again not be limited in this or other aspects to the examples described in this disclosure.

As further shown in FIG. 1, service provider network 16 further includes a router 28. Router 28 may represent a L3 network device that routes, rather than switches, data units from access network 22 to public network 14 and from public network 14 to access network 22. Router 28 may actively select between one or more routes to a destination and forward packets along the selected route, while switch 26 may generally maintain only one route to each destination and simply switch the data units to the appropriate destination. In this respect, a L3 network device, such as router 28 may differ from a L2 network device, such as switch 26.

As described above, service provider network 16 typically facilitate access of public network 14 by subscriber networks 20 and subscribers contract with service provider network 16 for this so-called "network access." In the past, subscribers also contracted for various other services offered over other networks maintained and operated by this or other service providers, such as a telephone service offered over a Plain Old Telephone Service (POTS) copper-based network and a television service offered over a coaxial cable-based network or a satellite-based network.

Recently, however, service providers have begun leveraging the flexibility to communicate any form of data, such as voice data associated with a telephone service and video data associated with a television service, over access networks, such as access network 22. For example, service providers now offer a telephone service over access network 22 referred to as Voice over IP or VoIP and a television service referred to as IP television or IPTV. Service providers now offer so-called triple-play packages, in which the service provider packages these data, voice and video services into a single service contract with a reduced price. This ability of a single service provider to offer these three services in one package has brought previously tangential competitor service providers, such as traditional cable television service providers and telephone service providers, into direct competition.

The rush by service providers to be first to market with a well-priced triple-play package has led to rapid development of previous technologies to accommodate delivery of both voice and video services over both L2 and L3 networks. In instances, delivery of these services has leveraged past technologies for new uses. For example, a multicast management protocol referred to as Internet Group Management Protocol (IGMP) was originally developed for academic use to enable multiple research and other scientific centers to communicate with one another simultaneously over a packet switched network. IGMP has since been used to facilitate delivery of IPTV channels to multiple subscriber networks.

With respect to IPTV, multicast servers 18 may store video content for a plurality of multicast groups. Each multicast group may represent an IPTV channel and the content associated with the multicast content may comprise channel data. Multicast servers 18 may report this group to access nodes 24, which then inform subscriber devices of subscriber networks 20 of this channel. Subscriber devices are shown in FIG. 1 as customer premise equipment (CPE) 30 ("CPE 30") and each of CPE 30 may comprise one or more of a Set-Top Box (STB), a desktop computer, a laptop computer, a PDA, a VoIP telephone, a regular telephone, a cellular phone, a smart phone, a wireless access point (WAP), a router, a switch, a hub or any other type of computing or network device capable of accessing or facilitating access of multicast content.

While described with respect to multicast servers 18 located in public network 14, the techniques may also apply in instances where service provider network 16 includes multicast servers similar to multicast servers 18 dedicated to delivery of multicast streams for IPTV purposes. In this example, service provider network 16 may download video content via satellites or some other high-speed download mechanism and store/stream this video content to the multicast servers.

Regardless of where multicast servers 18 are located, CPE 30 of subscriber networks 20 may forward a message requesting to join one of the multicast groups to access node 24 in accordance with the multicast management protocol, IGMP. The join message may be referred to as a membership report message within the IGMP standards and this join message is sent by a "host" (a term used by the IGMP standards to refer to a member of a multicast group) whenever this host joins a particular one of the multicast groups.

Each of access nodes 24 may store data defining a multicast group membership table comprising table entries for each one of subscriber networks 20 connected to the respective ones of access nodes 24. Each table entry may list the multicast groups to which each respective one of subscriber networks 20 is a member. Access node 24 may update this table based on the membership report message to update the respective table entry to reflect the joining of the multicast group by the corresponding one of subscriber networks 20.

Access nodes 24 may then receive content corresponding to this recently joined multicast group from multicast servers 18. This content may be referred to as "multicast streams" in that delivery of content may occur in real-time and therefore data may continually be delivered or streamed from the multicast servers 18 to IGMP hosts or members of the multicast group. The data units of the multicast stream may reference the multicast group by way of a multicast group identifier, which is typically referred to as multicast group IP address. Access nodes 24 may extract this multicast group IP address and use this address as a key to access the multicast group membership table. For each table entry listing the multicast group identified by extracted multicast group address, access nodes 24 may replicate the multicast stream and deliver a copy of the multicast stream to those of subscriber networks 20 that are members of the group.

CPE 30, which in the case of IPTV generally represent Set-Top Boxes (STBs) connected to Televisions located within the subscriber premises, may "consume" this multicast stream, typically, by buffering the multicast stream and reformulating the multicast content, e.g., video and/or audio data, for display via the connected television. The subscriber may, at some point after consuming this first multicast stream, want to consume another or second multicast stream. That is, in terms of IPTV, the subscriber may interact with one of CPE 30 to change the channel, thereby requiring that CPE 30 to issue an IGMP leave message followed by a subsequent IGMP join message, which again is referred to as an IGMP membership report.

In response to the IGMP leave message, access nodes 24 may issue an IGMP membership query message to those IGMP hosts, e.g., CPE 30, of subscriber networks 20 attempting to leave the identified multicast group. The IGMP membership query message may solicit an IGMP membership report from these CPE 30 that are members of an identified multicast group, which in this case is the first multicast group. Those of CPE 30 that are members of the multicast group may respond to the membership query message by issuing another IGMP membership report message that lists the identified multicast group. If no IGMP membership report messages are sent, access node 24 may determine that no other CPE 30 are requesting multicast content associated with the multicast group and stop delivering this multicast content to the one of subscriber networks 20. This form of leave is referred to as a "standard" leave as it complies with the IGMP standards. However, for IPTV, a standard leave may significantly increase the time it takes to change channels, especially for shared subscriber lines.

Thus, where possible, access nodes 24 may implement an "immediate" leave procedure. This immediate leave requires that access nodes 24 store and maintain data either in the multicast group membership table or another table reflecting a number of members for each multicast group within the context of subscriber networks 20. That is, each table entry of the multicast group membership table may list not only those groups CPE 30 of the associated subscriber network 20 to which these CPE 30 belong but also a count of these CPE 30 that are currently members of each multicast group. Access nodes 24 may then, rather than implement the above standard leave, access its multicast group membership table to determine whether any other CPE 30 of the one of subscriber networks 20 that originated the IGMP leave message are members of the multicast group indicated in the IGMP leave message.

For example, if the count for this identified multicast group in the table entry corresponding to the one of subscriber networks 20, e.g., subscriber network 24A, that originated the IGMP leave message is greater than two, the corresponding one of access nodes 24, e.g., access node 24A, may update the multicast group membership table to reflect the leave of the group by decrementing the count by one and continue delivering, possibly by way of replication, the multicast stream corresponding to the identified multicast group to subscriber networks 20A. If this count equals one, however, the corresponding access node 24A may update the entry by decrementing the count by one and stop delivering the multicast stream for this identified multicast group to subscriber networks 20A. By implementing this immediate leave, access node 24A may substantially improve the efficiency of IPTV channel changes, as the cumbersome and time consuming IGMP membership query may be avoided.

To finish the channel change, one of CPE 30 of subscriber networks 20A may issue a membership report message listing the second multicast group. Access node 24A may perform the above described operations to update the multicast group membership table to reflect joining this second multicast group. Access node 24A may then receive the multicast stream for this second multicast group from one of multicast servers 18 and deliver this multicast stream to subscriber network 20A for consumption by this host, e.g., the one of CPE 30 that originated the IGMP membership report. In this manner, service providers may provide for an IPTV server that enables CPE 30 to subscribe to or otherwise join a multicast group, receive multicast content associated with that group, consume that content, and switch between multicast groups in a manner reflective of a channel change.

However, as IGMP has quickly been adapted from a protocol to manage a small academic information sharing service in a time where bandwidth was of little concern to a mass-consumer service in a time where service providers often oversubscribe bandwidth, certain deficiencies of IGMP have appeared under this more bandwidth sensitive application. For example, the IGMP standard does not require that access nodes 24 acknowledge an IGMP leave message and moreover does not require CPE 30 or IGMP hosts in general to resend an IGMP leave message. Thus, an IGMP host may send only a single IGMP leave message. If this IGMP leave message is lost, however, bandwidth inefficiencies may occur as access nodes 24 may not update the multicast group membership table to reflect the leave and therefore may continue to deliver this multicast stream associated with this multicast group to CPE 30 that do not consume the multicast content (as they have left the group).

Instead, the IGMP standard provides for an IGMP general query message that solicits from all CPE 30 connected to a particular one of access nodes 24, e.g., access node 24A, the above described IGMP membership report message. Access node 24A then correlates the multicast groups to which these CPE 30 are currently members into a table, compares this table against the multicast group membership table to identify lost IGMP leave messages, and updates the multicast group membership table based on the comparison.

Access node 24A may also update another table, referred to as multicast distribution table, in response to identifying a lost leave message. This multicast distribution table may indicate those multicast streams that access node 24A is to delivery to each of subscriber networks 20 coupled to access node 24A. Thus, upon identifying a lost leave message, access node 24A may update this multicast distribution table in some instances to reflect that none of CPE 30 of subscriber network 20A, for example, is currently consuming a particular one of the multicast streams indicated in the multicast distribution table. The multicast distribution table may be stored with multicast group membership table and therefore reference to updating the multicast group membership table may indicate an update to the multicast distribution table.

This process may have proved efficient in less bandwidth sensitive times where only a small number of devices were members of multicast groups, but in recent times, with the growth of IPTV in particular, possibly hundreds if not thousands of CPE 30 may connect to a single one of access nodes 24 and join and leave multicast groups. Soliciting membership report messages from each of these CPE 30, correlating the multicast groups indicated in the reports and comparing the correlated groups with those of the multicast group membership table may consume significant resources (e.g., processing power and memory space) of access nodes 24. Moreover, the hundreds, if not thousands, of membership reports sent by CPE 30 in response to the general query may consume significant bandwidth. This overhead bandwidth may impact delivery of the IPTV service. Furthermore, to quickly detect these lost leave messages on the scale of IPTV multicast service, access nodes 24 would have to increase the frequency with which these normally periodic general query messages are sent, further increasing the bandwidth consumption over a set period of time.

In accordance with the techniques described herein, one or more of access nodes 24 may store data defining a number of multicast streams currently being delivered by the access node to the subscriber network. This current number of multicast streams may directly correspond to the number of multicast groups to which CPE 30 of a particular one of subscriber networks 20 are currently members. This current number of multicast streams therefore may also be referred to as the current number of multicast groups. In any event, each of these access nodes 24 may also determine a threshold value based on a number of multicast streams that the access node previously delivered simultaneously to respective ones of subscriber network 20.

To determine this threshold value, access nodes 24 may store historical data related to past delivery of multicast streams to each of the respective ones of subscriber networks 20. Access nodes 24 may store this historical data in a table data structure in some instances, where each entry into this historical group membership data table corresponds to one of the respective ones of subscriber networks 20. The entry may store a historical stream count for a set period of time, e.g., 30 days, 7 days, 1 day, or some other set time (such as more frequent periodic times of 3, 5, 10 or 15 seconds). Each stream count may be built or otherwise determined using a current stream count which access nodes 24 may track. Alternatively, access nodes 24 may determine each stream count whenever a general query message and successive membership report messages are received in response to the general query message. Based on this historical data maintained for each respective one of subscriber networks 20, access nodes 24 may determine a threshold value for each of subscriber networks 20 to which each of access nodes 24 respectively couples. For example, access nodes 24 may determine each access node as a moving average or a maximum (either local or all-time maximum) of the historical stream counts. In this respect, access nodes 24 may determine a threshold value based on past historical data reflective of the behavior of subscribers in directing CPE 30 to access multicast content.

One of access nodes 24, e.g., access node 24A, may then receive a message requesting to join a multicast group, e.g., a join message in the form of an IGMP membership report, from a subscriber device or a CPE 30 in accordance with a multicast management protocol, which in this case is assumed to be IGMP for purposes of illustration. In response to this join message, access node 24A may determine a projected stream count by adding one to the current number of multicast streams and, next, determine whether the projected stream count exceeds the adaptive threshold value.

If the projected stream count does not exceed the adaptive threshold value, access node 24A may, in effect, determine that the request to join this multicast group is within the bounds of normal subscriber behavior. Furthermore, access node 24A may, in effect, further determine that a general query is unnecessary considering that this one of subscriber networks 20, e.g., subscriber network 20A, in which this requesting CPE 30 resides is acting "normally" within the meaning of the threshold value. Consequently, access node 24A may admit the requesting CPE 30 to the multicast group by updating the multicast group membership table with the multicast group identifier and increasing the multicast stream count for the respective one of subscriber networks 20, e.g., subscriber network 20A, in which CPE 30 resides.

However, if the projected stream count exceeds the adaptive threshold value, access node 24A may, in effect, determine that the request to join this multicast group is not within the bounds of normal subscriber behavior. As a result, access node 24A may determine that an IGMP general query message is necessary considering that subscriber networks 20A in which CPE 30 resides is not acting "normally." Thus, access node 24A may generate and forward an IGMP general query message and receive in response to this IGMP general query message an IGMP membership report from each CPE 30 coupled to access node 24A. As described above, access node 24A may correlate the reports and compare the correlated reports to its multicast group membership table. Based on this comparison, access node 24A may identify lost IGMP leave messages and update the multicast group membership table accordingly, e.g., by decreasing any stream counts and removing those multicast groups with associated stream counts that equal zero.

With respect to subscriber network 20A that was determined to be acting inconsistently or out of the bounds of "normal" with respect to the threshold value, access node 24A may determine whether the stream count associated with subscriber network 20A changed as a result of the above comparison. If the stream count did not change, access node 24A may determine that the behavior is "normal" considering that CPE 30 of subscriber network 20A accounted for each of the multicast groups via the membership report messages. In other words, access node 24A may challenge subscriber network 20A with a general query message if those CPE 30 of subscriber network 20A appear to reflect activity by the subscriber outside the bounds of normal. If this challenge however results in an affirmation of that behavior, e.g., that each CPE 30 of subscriber network 20A affirms membership to every one of the multicast streams maintained in the multicast membership table, access node 24A may reclassify this behavior as normal. As a result, access node 24A may update the threshold value determined for subscriber network 20A in response to the affirmation of this non-normal behavior. In this instance, access node 24A may update the threshold value to equal the current stream count just affirmed by CPE 30 of subscriber networks 20A, which was previously assumed to be outside the bounds of normal with respect to the threshold value determined for subscriber network 20A. In this respect, access node 24A may adapt threshold value to accommodate "normal" behavior of CPE 30.

If the stream count has changed or after updating the threshold value in response to a non-changing stream count, access node 24A may again determine the projected stream count. Access node 24A may then compare the projected stream count to a corresponding one of a plurality of stream count limits. The stream count limits may be configured so as to limit the number of streams a given subscriber may receive at any given time. Access node 24A may deny the join request, if the stream count still exceeds the corresponding one of the stream count limits. Access node 24A may deny the request by not updating the multicast group membership table to either include the multicast group or increase the member count with respect to this membership group, if already included within the table entry associated with the subscriber network. However, if the stream count is less than or equal to the corresponding one of the stream count limits, access node 24A may grant the join request by updating the multicast group membership table to either include the multicast group or increase a member count for this multicast group, if already included within the table entry associated with the subscriber network. In this respect, access node 24A may admit the subscriber device to the multicast group based on the determination of whether the projected stream count exceeds the corresponding one of the stream count limits.

These stream count limits may, in effect, serve as a static cap on the adaptive threshold values that may enable fixed differentiation of services. For example, a subscriber that subscribes to a premium service may be allocated a very high, or even unlimited, stream count limit within an access node, where the adaptive threshold value may be applied to efficiently manage multicast streams. Another subscriber however may subscribe to a lower-level service and an operator or administrator of the network may allocate a set stream count limit that is lower than that allocated for the premium subscriber. Yet, the adaptive threshold value may still be applied to efficiently manage multicast streams, regardless of the stream count limit. In this respect, the stream count limit may serve to cap services so as to differentiate, as one example, between different service levels.

In this manner, the techniques may enable an access node, such as access node 24A, to adaptively determine a threshold value based on historical data reflective of past subscriber behavior. Based on this threshold value, the access node may detect abnormal or out of bound subscriber behavior and challenge the subscriber network to validate this behavior, e.g., via an IGMP general query message. The access node may then determine based on this challenge whether the behavior is in fact normal or abnormal and either admit (or in other words honor) or deny a request from the subscriber network to join a new multicast group.

Typically, the access node challenges the subscriber network upon an initial determination of abnormal subscriber behavior instead of increasing the frequency of periodic general query messages. In some examples, the access node may continue to periodically issue general query messages but at a far reduced frequency compared to access nodes that do not implement the techniques described in this disclosure. In these examples, the access node may issue these periodic general query messages to collect historical data by which to determine the threshold value. In other examples, the access node may not periodically generate general query messages, instead relying solely on the techniques described in this disclosure to adaptively set a threshold. In these alternative examples, the access node may initially issue a number of general query messages to continually challenge and reset the threshold values or may come pre-configured (e.g., either from the manufacture or by way of an initial initialization procedure performed by an administrator) with an initial threshold to avoid what may be referred to as a period of learning in which the access node "learns" the behavior of the subscriber (or stores the historical data). Regardless, the techniques may substantially reduce the overhead (e.g., access node resource utilization and subscriber line bandwidth) described above with respect to the general query messages and successive membership report messages sent in response to the general query message.

Moreover, rather than implement a static, inflexible stream count limit or threshold value that may inappropriately deny legitimate joins to multicast groups (e.g., normal subscriber behavior), the access node may implement the techniques to adapt the threshold value to subscriber behavior. For example, often CPE 22, such as STBs, may simultaneously join multiple multicast groups in addition to those requested by the subscriber.

Figure 2:
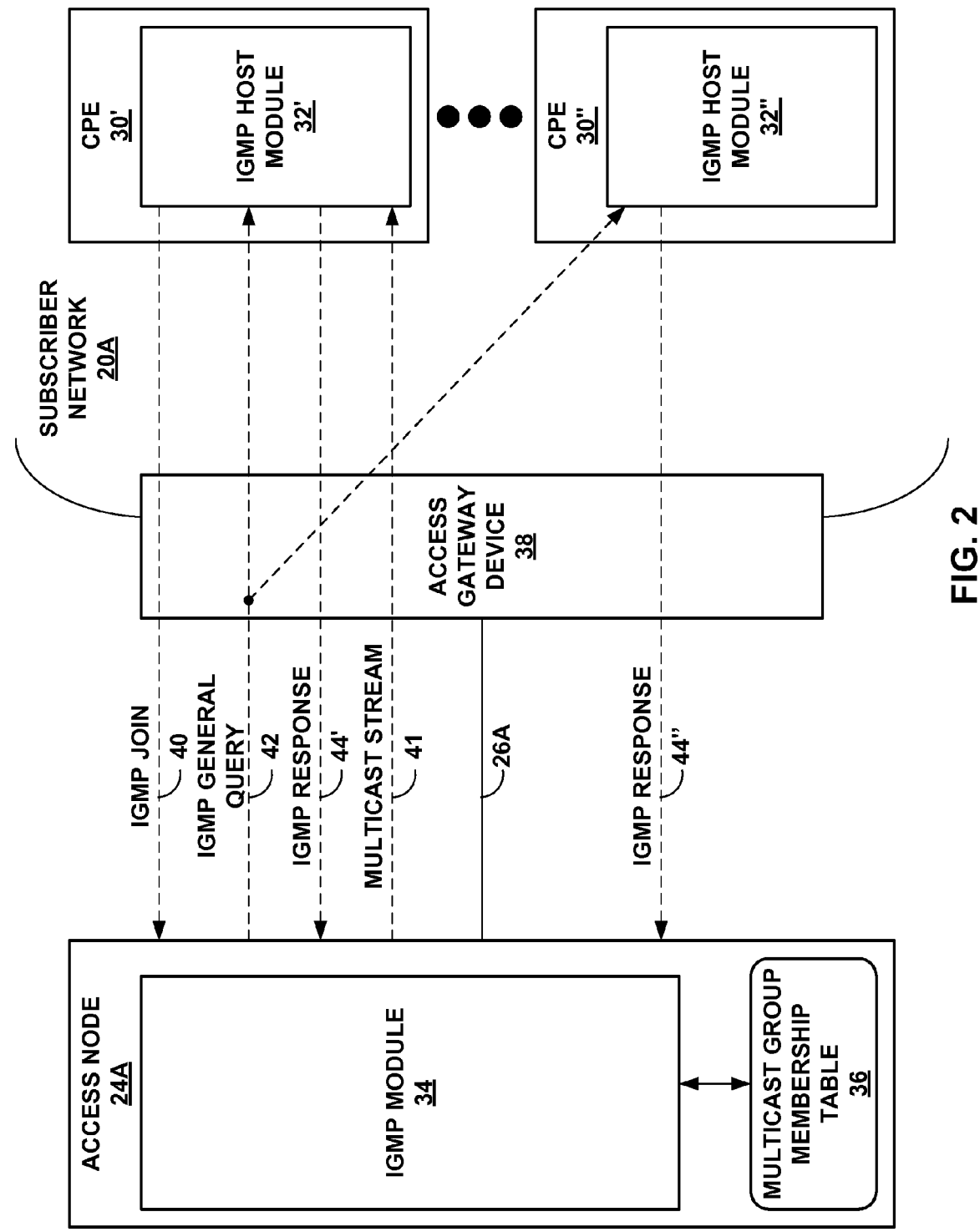
FIG. 2 is a block diagram illustrating example interaction between an access node that implements the techniques described in this disclosure and a subscriber network.

To illustrate, a STB may join a multicast group that provides a multicast stream defining an onscreen programming guide that lists the programming available on each channel for the next couple of weeks. The STB may also join a multicast group that provides a multicast stream defining interactive games or Pay-Per-View (PPV) content. The STB may comprise multiple line cards capable of simultaneously consuming two video channels at the same time, one for recording and the other for viewing, and the STB may therefore join a multicast group that provides the multicast stream being recorded. In any event, as IPTV service evolves, STBs and other CPE may simultaneously and legitimately join more and more multicast streams that would require constant resetting of static threshold values. The techniques therefore reduce administrative oversight and in fact may effectively automate threshold limits by eliminating the need for administrators to constantly update static limits to accommodate evolving services, such as IPTV FIG. 2 is a block diagram illustrating example interaction between access node 24A and subscriber network 20A, both of FIG. 1, in which access node 24A implements techniques described in this disclosure. As shown in FIG. 2, different CPE 30 of subscriber network 20A are denoted as CPE 30' through CPE 30" to facilitate reference to a particular one of CPE 30 of subscriber network 20A. This designation continues for modules included within CPE 30 of subscriber network 20A as well also to facilitate reference to a particular one of these modules of CPE 30 of subscriber network 20A. For example, CPE 30 of subscriber network 20A each includes IGMP host modules 32, which are denoted in FIG. 2 as IGMP host modules 32' through 32".

As further shown in FIG. 2, access node 24A includes an IGMP module 34, which may be similar to IGMP host modules 32 included within each of CPE 30 of subscriber network 20A. IGMP module 34 represents a hardware and/or software module that implements so-called "router" aspects of IGMP in accordance with the IGMP standards. That is, IGMP module 34 may generate and forward the above described IGMP general query message and IGMP membership query message as well as maintain a multicast group membership table 36 in the manner described above. IGMP host modules 32 may represent a hardware and/or software module that implements so-called "host" aspects of IGMP in accordance with the IGMP standards. In other words, IGMP host modules 32 may generate and forward IGMP membership report messages to join a multicast group and respond to IGMP general and membership query messages. IGMP host modules 32 may also generate and forward IGMP leave messages to leave a multicast group.

More information concerning IGMP messages and general IGMP operation can be found in one or more of three version of a standard defining IGMP. The first version of the IGMP standard, referred to commonly as IGMPv1, is set out in Request For Comments (RFC) 1112, entitled "Host Extensions for IP Multicasting," by S. Deering, dated August 1989, herein incorporated by reference in its entirety. The second version of the IGMP standard, referred to commonly as IGMPv2, is set out in RFC 2236, entitled "Internet Group Management Protocol, Version 2," by W. Fenner, dated November 1997, herein incorporated by reference in its entirety. The third version of the IGMP standard, referred to commonly as IGMPv3, is set out in RFC 3376, entitled "Internet Group Management Protocol, Version 3," by B. Cain et al., dated October 2002, herein incorporated by reference in its entirety. IGMP module 34 and IGMP host modules 32 generally represent hardware and/or software modules that implement IGMP in accordance with one or more of these various versions of the IGMP standard.

Subscriber network 20A further includes an access gateway device 38, which is not shown in FIG. 1 for ease of illustration purposes. Access gateway device 38 represent one example of a network device that facilitates access to service provider network 16 or, in other words, provides a gateway by which CPE 30'-30" may access service provider network 16. Often, service providers provide access gateway device 38 to subscribers as part of the service contract and, in this instance, access gateway device 38 may comprise a cable modem or a Digital Subscriber Line (DSL) modem. These types of access gateway devices 38 may also commonly include switch or hub functionality or, in some instances, a wireless access point (WAP) by which CPE 30'-30" may connect to access network device 38. While described with respect to these types of access gateway devices, the techniques may be implemented with respect to any type of access gateway device, including those that comprise one or more of a modem, a hub, a switch, a router, a WAP, or any other component for interconnecting one network, e.g., subscriber network 20A, to another network, e.g., service provider network 16.

Initially, one of CPE 30 of subscriber network 20A, such as CPE 30', may issue an IGMP join message 40 via access gateway device 38 to access node 24A. In particular, IGMP host module 32' of CPE 30' may issue IGMP join message 40 to IGMP module 34 of access module 34. IGMP module 34 may access multicast group membership table 36 in response to receiving IGMP join message 40. For example, IGMP module 34 may determine an interface identifier identifying an interface of access node 24A to which subscriber line 26A connects to access node 24A and access table 36 in response to IGMP join message 40 to retrieve an entry of table 36 associated with the interface identifier. The interface identifier may comprise, as one example, a port number identifying a port of an interface card. In this manner, IGMP module 34 may retrieve an entry of table 36 associated with subscriber network 20A for dedicated subscriber lines 26A. For shared subscriber lines, IGMP module 34 may determine the interface identifier as a VLAN tag or a flow identifier (ID) and use this VLAN tag or flow ID to retrieve a table entry of table 36 associated with subscriber network 20A.

In any event, this entry may define one or more multicast groups to which CPE 30 of subscriber network 20A belong as members. IGMP module 34 may first determine whether the multicast group identified in IGMP join message 40 is included within the one or more multicast groups. If so, IGMP module 34 may honor IGMP join message 40, as access node 24A is already delivering a multicast stream for this multicast group to subscriber network 20A. The entry may further include a member count for each of the one or more multicast groups defined within the entry and IGMP module 34 may increase a member count for this one of the one or more multicast groups of the entry to reflect the honoring of IGMP join message 40. "Honoring" may refer to the act by IGMP module 34 in agreeing to deliver the multicast stream to the requesting subscriber network 20A.

If the multicast group is not included within the one or more groups of the entry and therefore is a new multicast group with respect to this subscriber network, access node 24A may next determine from the retrieved entry an adaptive threshold value associated with subscriber network 20A. This adaptive threshold value may be computed based on historical data in the manner described above. In any event, access node 24A may determine whether this threshold value is less than or equal to a minimum limit. This minimum limit may equal zero by default, or may be configured by an administrator or other user to a different nonzero value to facilitate quicker admission of CPE 30 to new multicast groups in high bandwidth networks. If the threshold value is less than or equal to the minimum limit, IGMP module 34 may honor IGMP join message 40 in the manner described above without performing any further actions and may deliver a multicast stream 41 associated with the new multicast group to subscriber network 20A.

In the event, however, the threshold value exceeds the minimum limit, IGMP module 34 may determine a number of multicast streams currently being delivered to subscriber network 20A from the retrieved table entry and calculate a projected stream count based on this current number. That is, the entry may store the number of multicast stream currently being delivered to subscriber network 20A or alternatively IGMP module 34 may determine the number of multicast streams currently being delivered to subscriber network 20A based on the number of one or more multicast groups stored to this entry. IGMP module 34 may determine the projected stream count as the current number plus one to include the new multicast stream that may be delivered if IGMP join message 40 is honored. If the projected stream count is less than the threshold value, IGMP module 34 may honor IGMP join message 40 in the manner described above and deliver multicast stream 41 associated with this new multicast group to subscriber network 20A.

Yet, if IGMP module 34 determines that the projected stream count is greater than the threshold value, IGMP module 34 may generate and broadcast an IGMP general query message 42 to those of subscriber network 20 coupled to access node 24A, including subscriber network 20A. CPE 30 of subscriber network 20A may each respond to IGMP general query message 42 by causing each of IGMP host modules 32 to generate and forward a respective one of IGMP response messages 44, which are shown in FIG. 2 as IGMP responses 44'-44". IGMP response messages 44 may comprise an IGMP membership report message sent in response to an IGMP general or membership query message. In this way, IGMP module 34 challenges IGMP host modules 32 to provide proof via the IGMP membership report messages detailing the multicast groups to which each of IGMP host modules 32 belong.

IGMP module 34 may receive these IGMP response messages 44, parse the multicast groups indicated in these messages 44 and correlate the multicast groups to generate data defining a current set of multicast groups as well as a current member count with respect to the current set of multicast groups. The table entry may therefore store a working set of multicast groups and respective working member counts, as well as a working current number of multicast groups, each of which may or may not be current. IGMP module 34 may compare the current set and member count to the working set and member count and note any differences. IGMP module 34 may also determine a new number of multicast streams currently being delivered based on the number of multicast groups to which CPE 30 of subscriber network 20A belong and compare this current number to the old working number, which may or may not be current. If the current number is the same as or equal to the working number, IGMP module 34 may recalculate the threshold value using the working number plus one (to accommodate the new multicast stream from the new multicast group), as this number now represents accurate historical data that IGMP module 30 has determined not to be corrupted by a lost IGMP leave message.

If the current number is not the same as or equal to the working number, IGMP module 34 may determine that an IGMP leave message was lost at some point between broadcasting successive IGMP general query messages. In this instance, IGMP module 34 may update the table entry to reflect any lost IGMP leave messages by decrementing member counts and possibly removing one or more of the multicast groups stored in the table entry, if the member count is decremented to zero. In this respect, IGMP general query messages represent synchronization messages requesting information via IGMP membership report messages from IGMP host modules 32 to resynchronize multicast group membership table 36. IGMP module 34 may recalculate the threshold value using the current number plus one (for the new multicast stream from the new multicast group) rather than the working umber, as the working number was determined to be corrupt due to lost IGMP leave messages.

IGMP module 34 may then re-determine the projected stream count based on the newly determined current number in the same way as described above. IGMP module 34 may compare the projected stream count to the re-calculated threshold value, also as described above. It should be noted that if the threshold value is calculated as a local maximum of the historical data, the projected stream count should be greater than or equal to the threshold value. However, if the threshold value is determined using a longer moving average, especially if the calculation does not round up, the projected stream count may not be less than or equal to the threshold value.

While described with respect to a maximum or moving average calculation, the techniques may be implemented such that the threshold value is calculated by any other adaptive calculation, including exponential moving average calculations, weighted average calculations (e.g., with weights favoring more recent stream counts or stream counts captured during certain times of the day), and overall average calculations (which may reduce if not substantially eliminate the need to store historical data as all that is required is a number of data points, the average and the most recent data point to calculate an average).

Notably, changing the calculation used to calculate the threshold value may significantly impact the delivery of the multicast IPTV service. In some instances, IGMP module 34 may adaptively calculate the threshold value for different subscriber networks 20A-20M using different methods of calculation. Moreover, with respect to one subscriber network, IGMP module 34 may calculate the threshold value using a first calculation method at a first time of day and a second calculation at a second time of day. In this respect, IGMP module 34 may not only adapt the threshold value to general subscriber behavior but also to subscriber behavior at a certain time of day. This aspect of the techniques may promote better bandwidth assignment between services in certain instances.

For example, some subscribers often do not watch television much during the day, as these subscribers may be away at work. However, upon arriving home from work, the subscriber may immediately turn on the television, check his email and make a telephone call. The access node may use a moving average and calculate the adaptive threshold more aggressively when other services are more likely to be utilized and use a different computation, such as local maximum, at different times (based on historical utilization) to relax or otherwise reduce the frequency of the query interval. Consequently, the techniques should not be limited to any one method of calculating the threshold value and may be implemented by access nodes or other network devices in any manner to adaptively determine a threshold value using one or more adaptive calculation techniques.

Figure 3:
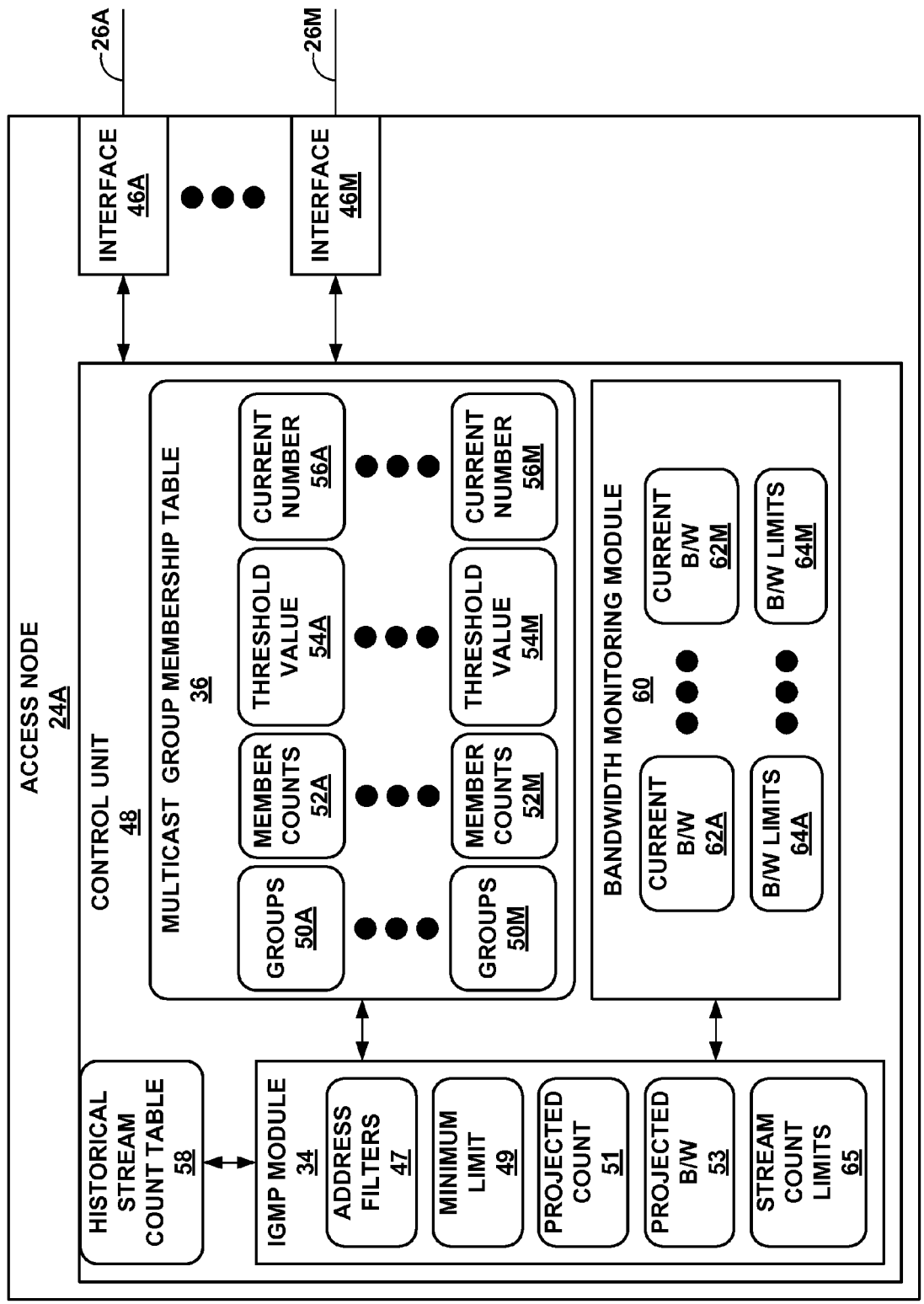
FIG. 3 is a block diagram illustrating, in more detail, an example access node that implements the techniques described in this disclosure.

FIG. 3 is a block diagram illustrating, in more detail, an example embodiment of access node 24A shown in FIGS. 1 and 2 that implements the techniques described in this disclosure. While the techniques are described below with respect to one of access nodes 24 of FIG. 1, each of access nodes 24 may comprise similar components to those described below with respect to access node 24A. In this respect, the techniques are described with respect to access node 24A for ease of illustration purposes.

As shown in FIG. 3, access node 24A includes interfaces 46A-46M ("interfaces 46") that couple to respective dedicated subscriber lines 26A-26M, which in turn couple to respective subscriber networks 20A-20M. Interfaces 46 may comprise ports of one or more interface cards (not shown in FIG. 3). Alternatively, for shared subscriber lines, interfaces 46 may comprise virtual interfaces to VLANs or other virtual networks. These virtual interfaces may comprise virtual ports or other abstractions that enable one physical port to virtually represent multiple ports through use of VLAN tags or other identifiers that enable distinction among virtual networks.

Access node 24A also includes a control unit 48 that couples to each of interfaces 46. Control unit 48 may comprise one or more processors (not shown in FIG. 3) that execute software instructions, such as those used to define a software or computer program, stored in a computer-readable storage medium (again, not shown in FIG. 3), such as a storage device (e.g., a disk drive, or an optical drive), or memory (e.g., a Flash memory, random access memory or RAM) or any other type of volatile or non-volatile memory that stores instructions (e.g., in the form of a computer program or other executable) to cause a programmable processor to perform the techniques described in this disclosure. Alternatively, control unit 48 may comprise dedicated hardware, such as one or more integrated circuits, one or more Application Specific Integrated Circuits (ASICs), one or more Application Specific Special Processors (ASSPs), one or more Field Programmable Gate Arrays (FPGAs), or any combination of the foregoing examples of dedicated hardware, for performing the techniques described in this disclosure.

Control unit 48 may include IGMP module 34, which may implement IGMP in accordance with one or more of the three versions of the IGMP standard, as described above. IGMP module 34 may store data defining address filters 47, a minimum limit 49, a projected stream count 51 ("projected count 51") and a projected bandwidth 53 ("projected B/W 53"). IGMP module 34 may apply address filters 47 to filter one or more multicast groups and related streams from certain portions of data stored within multicast group membership table 36 and historical stream count table 58. For example, IGMP module 34 may apply address filters 47 when updating current numbers 56 such that current numbers 56 only reflects streams related to IPTV service rather than multicast stream related to a data or VoIP service (e.g., or a video telephony service). An administrator or other user may configure address filters 47 via a user interface presented by a user interface module of control unit 48 (not shown in FIG. 3).

Minimum limit 49 represents data that stores the minimum limit described above which IGMP module 34 may use to initially evaluate threshold values 54. While shown as only a single minimum limit 49, IGMP module 34 may maintain one minimum limit 49 for each interface 46 (or, in other words, subscriber network 20A-20M) and may store data defining this minimum limit 49, in this instance, within each respective entry of multicast group membership table 36. Projected count 51 represents data defining a current number 56A plus a number of multicast streams that may be delivered should IGMP module 34 honor join request messages for these multicast streams. Often, IGMP module 34 calculates projected count 51 as one of current numbers 56 plus one. Projected bandwidth 53 represents data defining a total of a current bandwidth, e.g., one of below described current bandwidths 62A-62M ("current B/Ws 62"), plus a bandwidth that may be consumed should IGMP module 34 honor the join request messages for these multicast streams.

Control unit 48 also includes multicast group membership table 36 that stores data defining groups 50A-50M ("groups 50"), member counts 52A-52M ("member counts 52"), threshold values 54A-54M ("threshold values 54") and a current number 56A-56M ("current numbers 56"). Groups 50 each represent data defining one or more multicast groups to which each respective one of subscriber networks 20A-20M belong. Member counts 52 each represent data specifying a count or number of members or CPE 22 subscribed to the groups defined by respective one of groups 50. Threshold values 54 each represents data defining the above adaptive threshold value for a corresponding one of subscriber networks 20A-20M. Current number 56 each represents a current number of multicast streams being delivered to a corresponding one of subscriber networks 20A-20M.

While not shown explicitly in FIG. 3, multicast group membership table 36 may comprise one entry for each interface 46. For example, a first entry may be associated with interface 46A and store data defining groups 50A, member counts 52A, threshold value 54A and a current number 56A, all of which relate to subscriber network 20A coupled via subscriber line 26A to interface 46A. As another example, a second entry may be associated with interface 46B and store data defining groups 50B, member counts 52B, threshold value 54B and a current number 56B, all of which relate to subscriber network 20B coupled via subscriber line 26B to interface 46B. These entries may be accessed within multicast group membership table 36 using an interface identifier, such as a port number. In other words, the entries may be indexed in accordance with the interface identifier.

Control unit 48 may further include a historical stream count table 58 that stores data for each subscriber networks 20A-20M specifying previous legitimate count of multicast streams delivered previously to each of subscriber networks 20A-20M. IGMP module 34 may, as described above, determine each of threshold values 54 based on historical stream count table 58.

In addition to IGMP module 34, control unit 48 may also include a bandwidth monitoring module 60 that represents a hardware and/or software module that monitors bandwidth utilization over each of subscriber lines 26A-26M. Bandwidth monitoring module 60 may store data defining the above mentioned current bandwidths 62, as well as, bandwidth limits 64A-64M ("B/W limits 64"). Bandwidth monitoring module 60 may determine the current consumption of total bandwidth for each of subscriber lines 26 and store this current consumption as a percentage or some other relative measure as current bandwidths 62. Bandwidth monitoring module 60 may also store bandwidth limits 64 that each provide one or more limits that cap bandwidth usage for a respective one or more services, such as IPTV service, data service and VoIP service.

Bandwidth monitoring module 60 may store bandwidth limits 64 for each one of subscriber networks 20A-20M and associate each one of bandwidth limits 64 with a respective one of interfaces 46. Typically, each of bandwidth limits 64 reflects limits contracted for by the respective subscriber when subscribing to the respective services offered by the service provider. That is, the subscriber may desire only standard definition IPTV service for two televisions and the subscriber may set overall bandwidth limits for this form of IPTV service. For subscribers that desire High-Definition Television (HDTV) IPTV service, the service provider may set much higher overall bandwidth limits. Bandwidth limits 64 may be more relevant for shared subscriber lines so as to assure that two subscribers who share a single shared subscriber line receive their contracted for level of service, although bandwidth limits 64 may be applied to non-shared instances as well.

Thus, in addition to calculating an adaptive threshold and using this threshold to delivery multicast content in an efficient manner, as described above, bandwidth monitoring module 60 may be configure bandwidth-based limits, e.g., bandwidth limits 64. When configured in this manner, bandwidth monitoring module 60 may perform the additional checks described above to enforce these limits 60. While described with respect to bandwidth limits, other types of limits including stream count limits may be used to cap usage for these services, as described above.

Example stream count limits are shown in FIG. 3 as stream count limits 65 within IGMP module 34. IGMP module 34 may maintain one or more of stream count limits 65 for each one of subscriber networks 20 to which access node 24A couples. IGMP module 34 may then compare the projected count 51 to a corresponding one of stream count limits 65 in order to cap subscriber service usage. This may enable differentiation between service levels as described above.

Figure 4A:
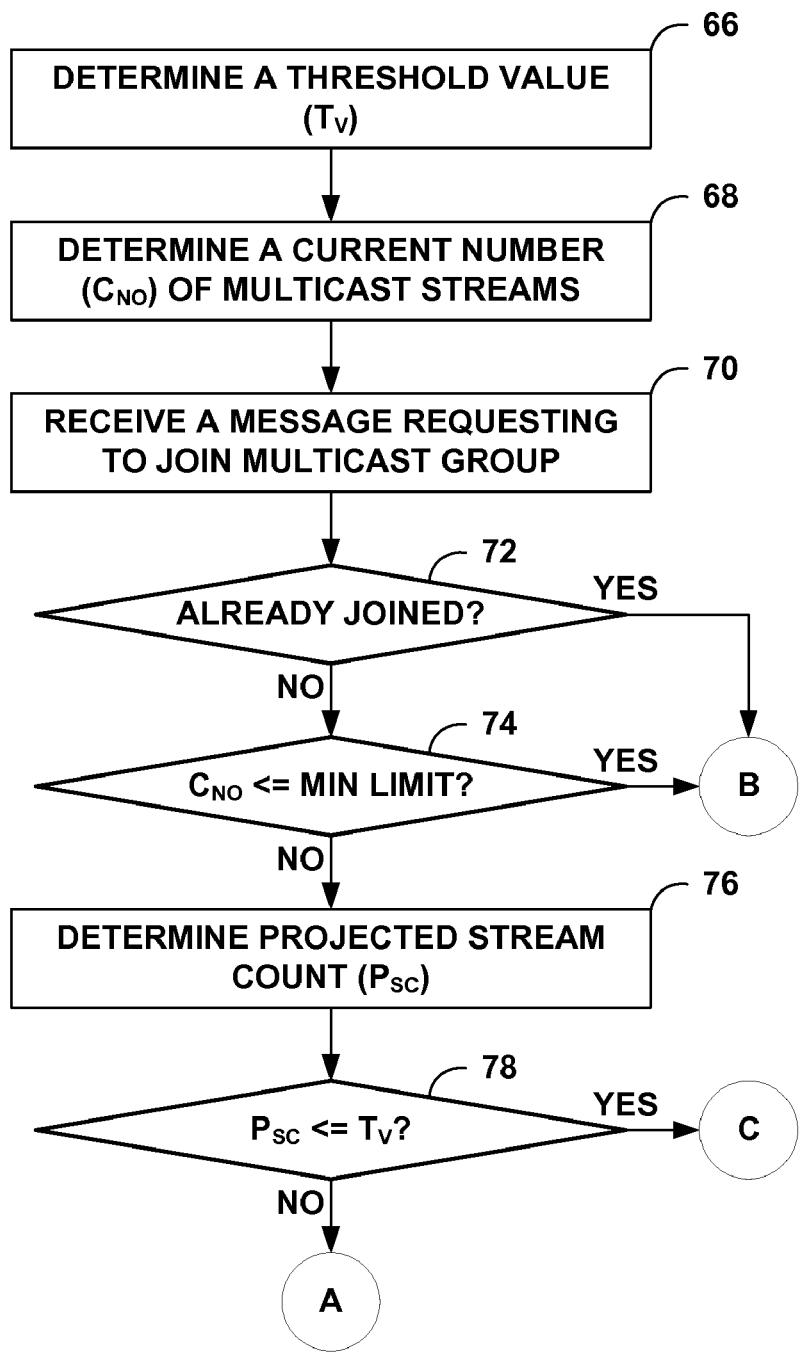
FIGS. 4A-4C are a series of interrelated flowcharts illustrating exemplary operation of a network device in implementing the techniques described in this disclosure.
Figure 4B:
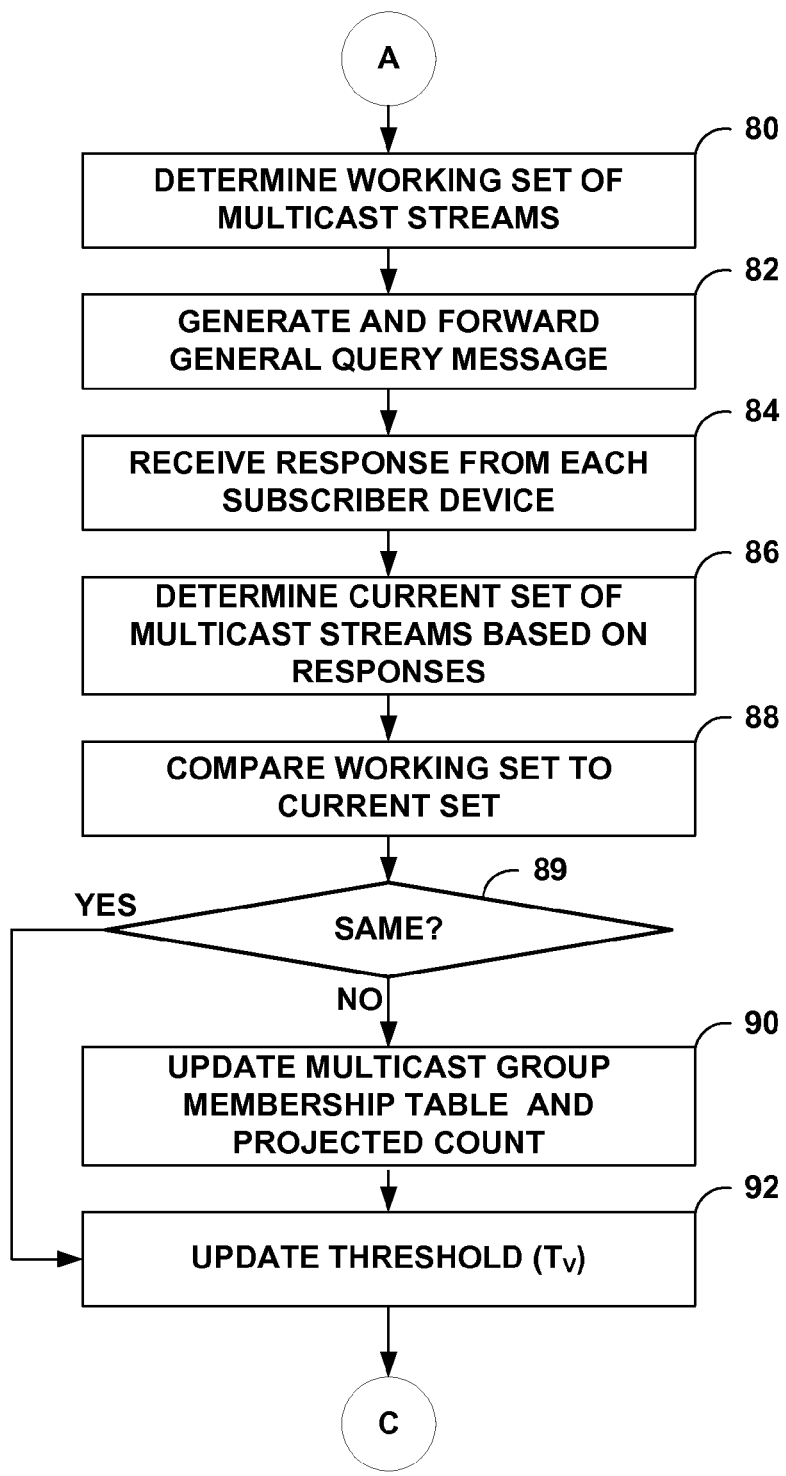
Figure 4C:
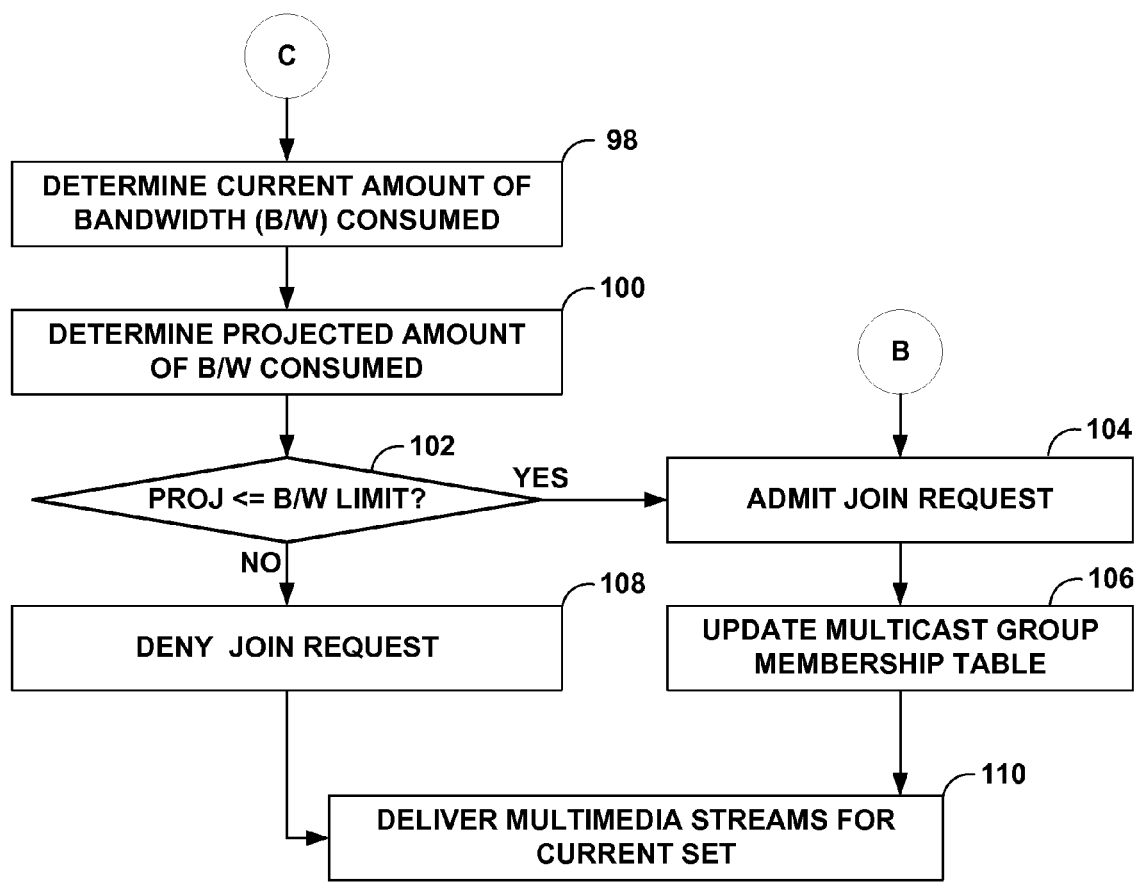

FIGS. 4A-4C are a series of interrelated flowcharts illustrating exemplary operation of a network device, such as access node 24A of FIGS. 1-3, in implementing the techniques described in this disclosure. While described with respect to a particular network device, e.g., access node 24A, and a particular implementation of that network device, e.g., access node 24A as shown in FIG. 3, the techniques may be implemented by any network device that manages multicast group memberships for delivery of multicast streams to members of the multicast group.

Referring to FIG. 4A, control unit 48 of access node 24A and, more particularly, IGMP module 34 of control unit 48 may initially determine one or more of threshold values 54 in the manner described above (66). For example, IGMP module 34 may generate and forward an IGMP general query message, such as IGMP general query 42 shown in FIG. 2, to each of subscriber networks 20A-20M via interfaces 46, respectively. Each of CPE 30 of each of subscriber networks 20A-20M may respond with an IGMP membership report message, such as the membership report message shown in FIG. 2 as IGMP response messages 44. Each one of these IGMP membership report messages may list those multicast groups to which the respective or originating CPE 30 belong.

IGMP module 34 may segment these multicast groups by subscriber network and store these groups within the associated entries of multicast group membership table 36 as groups 50. Based on the membership reports, IGMP module 34 may also determine the number of members each of these groups 50 have within each one of subscriber networks 20A-20M and store this data within the associated entries of multicast group membership table 36 as member counts 52. IGMP module 34 may further determine, for each of subscriber networks 20A-20M, the number of multicast streams access node 24A currently delivers to each one of subscriber networks 20A-20M. IGMP module 34 may determine this current number by counting the number of groups listed within each of groups 50. IGMP module 34 may in some embodiments store this data within the associated entries of multicast group membership table 36 as current numbers 56.

IGMP module 34 may, however, prior to updating current numbers 56 stored within multicast group membership table 36 store previous data defining the then "current" numbers 56 to historical stream count table 58. To limit the size of historical stream count table 58, IGMP module 34 may only store a certain amount of historical data that reflects certain durations of time, such as the last month, week or day, or even more granular durations of time, such as a last 3, 5, 10 or 15 seconds. IGMP module 34 may store this data either by replacing the oldest data or by writing new data. In any event, IGMP module 34 may then, in the manner described above, determine threshold values 54 for each of subscriber networks 20A-20M based on the data stored for each of these subscriber networks 20A-20M in historical stream count table 58. IGMP module 34 may store data within the associated entries of multicast group membership table 36 as threshold values 54.

As described above, in calculating threshold values 54, IGMP module 34 may also determine or calculate current numbers 56, which represent the current number of multicast streams being delivered to each of subscriber networks 20A-20M (68). The order of the flowchart steps as shown in FIG. 4A should not therefore be construed as specifying the order of operation with respect to various aspects of the disclosure, unless noted otherwise. The steps of the flowchart may merely represent steps taken by one implementation of the techniques. For example, IGMP module 34 may alternatively determine threshold values 54 based on the data stored to historical stream count table 58 without generating and forwarding the IGMP general query message, receiving the IGMP response messages, and updating multicast group membership table 36. IGMP module 34 may then perform these operations to determine current numbers 56, which would be reflecting of the order of steps as shown in FIG. 4A.

In any event, IGMP module 34 may at some point after determining threshold values 54 and current numbers 56 receive a message requesting to join a multicast group from one of subscriber networks 20A-20M, such as subscriber network 20A. This request message, which is shown in FIG. 2 as IGMP join message 40, may comprise an IGMP membership report message sent by one of IGMP host modules 32 and not in response to an IGMP general query message. IGMP module 34 may determine which of interfaces 46 IGMP join message 40 received this message 40 and access one of the entries of multicast group membership table 36 associated with this interface, e.g., by performing a lookup using an interface identifier (such as a port number). IGMP module 34 may then access one of groups 50, e.g., group 50A, associated with this entry and determine whether the multicast group indicated in multicast join message 40 is already joined by this or another CPE 30 within subscriber network 20A (72).

If the requested multicast group is not listed within groups 50A, IGMP module 34 may determine that the requested multicast group is not already joined ("NO" 72). Based on this determination, IGMP module 34 may then access one of current numbers 56, e.g., current number 56A, defined by this entry and compare current number 56A to minimum limit 49 to determine whether current number 56A is less than or equal to minimum limit 49. If not ("NO" 74), IGMP module 34 may then determine a projected stream count 51 in the manner described above (76). IGMP module 36 may then access one of threshold values 56, e.g., threshold value 56A, associated with the entry and determine whether projected stream count 51 is less than or equal to a threshold value 56A (78).

If projected stream count 51 is not less than or equal to threshold value 56A ("NO" 78), IGMP module 34, referring now to FIG. 4B, may determine a working set of multicast streams in the manner described above (80) associated with subscriber network 20A. That is, IGMP module 34 may access groups 50A, which stores a working rather than current set of multicast groups in that this list of groups may or may not be current due to lost IGMP leave messages. Thus, these groups represent a working set insomuch that IGMP module 34 may work with these groups until abnormal user behavior is detected, such as when projected stream count 51 is determined to exceed threshold value 56A ("NO" 78).

As a result, IGMP module 34 may, to determine whether the working set is current or not, generate and forward an IGMP general query message, e.g., IGMP general query message 42, and receive IGMP responses from each of CPE 30 of subscriber network 20A, such as IGMP responses 44 (82, 84). IGMP module 34 may then determine a current set of multicast streams based on these responses 44 in the manner described above and compare the working set to the current set, again as described above (86, 88). Upon determining that the working set is different from or not the same as the current set ("NO" 89), IGMP module 34 may update the associated entry within multicast group membership table 36 so that this entry is current and possibly update projected count 51 (90). For example, IGMP module 34 may reduce member counts within member counts 52A, remove one or more groups within groups 50A and update current number 56A based on the comparison. IGMP module 34 may, if current number 52A changed, update projected stream count 51.

If the working set is the same as the current set ("YES" 89) or after updating multicast group membership table 36 and projected stream count 51 in the manner described above (90), IGMP module 34 may update threshold value 54A (92). For example, if current number 56A is updated to the number determined by way of the IGMP general query message, IGMP module 34 may store the recently determined number to historical stream count table 58. If the current number 56A is not updated, IGMP module 34 may store this current number 56A in historical stream count table 58. In any event, upon storing a new data point to historical stream count table 58, IGMP module 34 may re-determine or update threshold value 54A based on this new data stored to historical stream count table 58, as described above. In some instances, access node 24A may proceed in this manner to update the threshold to detect lost leave requests, as described above.

In other instances, IGMP module 34 may continue to determine if projected stream count 51 is less than a corresponding one of stream count limits 65 or alternatively whether a determined current bandwidth exceeds a corresponding one of bandwidth limits 64. For illustrative purposes, the techniques are described below with respect to the bandwidth aspect however the techniques may also be implemented as described above with respect to the stream count limits. The techniques therefore should not be limited to the example described with respect to FIG. 4C.

Referring to FIG. 4C, IGMP module 34 may determine a current amount of bandwidth consumed by requesting that bandwidth monitoring module 60 monitor this bandwidth or otherwise provide one of current bandwidths 62, e.g., current bandwidth 62A, associated with subscriber line 26A (98). IGMP module 34 may then determine a projected amount of bandwidth consumed either by using a configured amount per multicast address or address range or by dynamically learning the bandwidth of the requested multicast channel through metering of the content and keeping track of the learned values over time (100).

If projected bandwidth 53 is determined to be less than or equal to this one of bandwidth limits 64A ("YES" 102), the multicast group is determined to be already joined (FIG. 4A: "YES" 72) or current number 54A is determined to be less than or equal to minimum limit 49 (FIG. 4A: "YES" 74), IGMP module 34 may admit or otherwise honor the IGMP join request and update multicast group membership table 36 to reflect the admission of the multicast group (104, 106). However, if projected bandwidth 53 is determined to exceed this one of bandwidth limits 64A ("NO" 102), IGMP module 34 denies the join request or refuses to admit the multicast group to multicast group membership table 36 (108). Regardless, after either admitting or denying the join of the requested multicast group, control unit 48 of access node 24A may deliver multicast streams for the current set of groups, e.g., those groups listed in groups 50A (110).

The techniques are described above with respect to various L2 and L3 network architectures for purposes of illustration. For example, service provider network 16 as being owned and operated by a telephone service provider that has expanded to offer various network or data services. In this example, service provider network 16 comprises a L2 access network 22 in which DSLAMs 24 provide access to subscriber networks 20.

While described with respect to this example network architecture, the techniques may be implemented by cable service providers who own and operate a L3 service provider network that includes a hybrid L2/L3 access network 22 in which CMTSes 24 provide access to subscriber networks 20.

The techniques may also be implemented with respect to other network architectures, including, as yet another example, Gigabyte Passive Optical Networks (GPONs) or any other type of PON or Active Ethernet (AE) optical network. In this example, a telephone or other service provider may implement a L2 or L3 access network in which access nodes 24 comprise Optical Line Terminals (ONTs) that facilitate access by Optical Node Terminals (ONTs) located at each of the subscriber premises. Each of the ONTs convert traffic or network data received from subscriber networks 20 into optical signals and deliver these optical signals upstream to OLTs 24, which then transmit multiple optical signals upstream to switch 26.

In many instances, one or more of these network architectures may be intermixed to provide a hybrid service provider network 16. For example, in a hybrid fiber coaxial network, subscriber lines 26 may comprise optical fiber lines and access nodes 24 may represent OLTs. Each of subscriber networks 20 may comprise ONTs for the reason described above. However, access network 22 may also include a CMTS sitting behind each of the OLTs and the OLTs may convert the optical signals back into RF signals for delivery over coaxial cable to the CMTS, which then forwards the data upstream to router 28 for delivery to public network 14. Thus, while described with respect to a particular network architecture, the techniques may be implemented with respect to any network architecture and should not be limited to any one network architecture described in this disclosure.

The techniques described herein may be implemented in hardware, software, firmware, or any combination thereof. Any features described as modules, units or components may be implemented together in an integrated logic device or separately as discrete but interoperable logic devices. In some cases, various features may be implemented as an integrated circuit device, such as an integrated circuit chip or chipset. If implemented in software, the techniques may be realized at least in part by a computer-readable medium comprising instructions that, when executed, cause a processor to perform one or more of the methods described above.

A computer-readable medium may form part of a computer program product, which may include packaging materials. A computer-readable medium may comprise a computer data storage medium such as random access memory (RAM), synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates code in the form of instructions or data structures and that can be accessed, read, and/or executed by a computer.

The code or instructions may be executed by one or more processors, such as one or more DSPs, general purpose microprocessors, ASICs, field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated software modules or hardware modules. The disclosure also contemplates any of a variety of integrated circuit devices that include circuitry to implement one or more of the techniques described in this disclosure. Such circuitry may be provided in a single integrated circuit chip or in multiple, interoperable integrated circuit chips in a so-called chipset.

Various examples of the techniques of this disclosure have been described. These and other examples are within the scope of the following claims.

The invention claimed is:

1. A method performed by an access node coupled to a subscriber network that includes a subscriber device, the method comprising:
   determining, with the access node, an adaptive threshold value based on a number of multicast streams that the access node previously delivered simultaneously to the subscriber network;
   receiving, with the access node, a message requesting to join a first multicast group from the subscriber device;
   determining a projected stream count based on a current number of multicast streams currently being delivered to the subscriber network and a requested multicast stream associated with the join message;
   determining, with the access node, whether the projected stream count exceeds the adaptive threshold value; and
   identifying one of the multicast streams currently being delivered to the subscriber network for which a leave message requesting to leave a second multicast group corresponding to this one of the multicast streams was not received by the access node based on the determination of whether the projected stream count exceeds the adaptive threshold value.

2. The method of claim 1, wherein determining the adaptive threshold value comprises:
   calculating a moving average of the number of multicast streams that the access node previously delivered simultaneously to the subscriber network; and
   setting the adaptive threshold value to the calculated moving average.

3. The method of claim 1, wherein determining the adaptive threshold value comprises:
   determining a maximum number from the number of multicast streams the access node previously delivered simultaneously to the subscriber device; and
   setting the adaptive threshold value to the determined maximum number.

4. The method of claim 1, further comprising:
   periodically generating a general query message in accordance with a multicast management protocol to query the subscriber network to determine those multicast groups to which the subscriber network subscribes to at the time of the general query;
   forwarding the general query to subscriber network;
   receiving, in response to the general query message, a response message from the subscriber network indicating the multicast groups to which the subscriber network subscribes at the time of each general query in accordance with the multicast management protocol; and
   storing, for each of the periodic general queries, data defining the number of the multicast groups to which the subscriber network subscribes at the time of the general query,
   wherein determining the adaptive threshold value comprises determining the adaptive threshold value based on an analysis of the data stored for each of the general queries defining the number of the multicast groups to which the subscriber network subscribes at the time of the general query.

5. The method of claim 1, further comprising:
   determining whether the current number is less than or equal to a minimum value before determining whether the projected stream count exceeds the adaptive threshold value; and
   admitting the subscriber device in response to determining that the current number of multicast streams is less than or equal to the minimum value without determining whether the projected stream count exceeds the adaptive threshold value.

6. The method of claim 1, further comprising:
   determining whether another subscriber device of the subscriber network is currently subscribed to the requested multicast group before determining whether the projected stream count exceeds the adaptive threshold value; and
   admitting the subscriber device in response to determining that the other subscriber device of the subscriber network is currently subscribed to the requested multicast group without determining whether the projected stream count exceeds the adaptive threshold value.

7. The method of claim 1, wherein determining whether the projected stream count exceeds the adaptive threshold value comprises determining that the projected stream count exceeds the adaptive threshold value,
   the method further comprising delivering the multicast streams for a first set of multicast groups to the subscriber network,
   wherein identifying one of the multicast stream comprises:
   in response to the determination that the current number plus the additional multicast stream exceeds the adaptive threshold value, generating a general query message in accordance with a multicast management protocol to query the subscriber network to determine those of the multicast groups to which the subscriber network currently subscribes;
   receiving, in response to the general query message, a response message from the subscriber network indicating a second set of multicast groups to which the subscriber network currently subscribes in accordance with the multicast management protocol; and
   determining whether the first set of multicast groups is the same as the second set of multicast groups to identify the one of the multicast streams currently being delivered to the subscriber network for which the leave message requesting the leave a corresponding one of the first set of multicast groups was not received by the access node.

8. The method of claim 7, further comprising:
   removing, based on the determination of whether the first set is the same as the second set, one or more of the first set of multicast groups to generate a revised first set of multicast groups and updating the current number of multicast streams to equal a number of the revised first set of multicast groups; and
   delivering the multicast streams for the revised set of multicast groups to the subscriber network.

9. The method of claim 1, further comprising:
   storing data that specifies a bandwidth service limit, wherein the bandwidth service limit defines a limit to an amount of service data that the access node delivers to the subscriber network, wherein the service data includes data corresponding to the multicast streams currently being delivered to the subscriber network;

determining a current amount of bandwidth consumed by the service data currently being delivered to the access node;

determining a projected amount of bandwidth consumed upon delivering the multimedia content for the requested multimedia group to the subscriber device;

comparing the total of the current amount plus the projected amount to the bandwidth service limit; and admitting, with the access node, the subscriber device to the multicast group based on the comparison.

10. The method of claim 1, further comprising:

storing data that specifies a stream count limit, wherein the stream count limit defines a limit on a number of the multicast streams that the access node currently delivers to the subscriber network;

comparing the projected stream count to the stream count limit; and admitting the subscriber device to the multicast group based on the comparison.

11. The method of claim 1, further comprising:

admitting, with the access node, the subscriber device to the multicast group;

updating, in response to admitting the subscriber device to the multicast group, the current number of multicast streams currently being delivered by the access node to the subscriber network to increase the current number by one;

delivering a new multicast stream to the subscriber network in response to admitting the subscriber device to the multicast group.

12. The method of claim 1, wherein the join message conforms to an Internet Group Management Protocol (IGMP), wherein the access node comprises one of a Digital Subscriber Line Access Multiplexer (DSLAM), a Cable Modem Termination System (CMTS), or a Optical Line Terminal (OLT), and wherein each of the number of multicast streams comprise a multicast stream for a different channel of an Internet Protocol Television (IPTV) service.

13. An access node coupled to a subscriber network that includes a subscriber device, wherein the access node comprising:

at least one interface that couples the access node to the subscriber network, wherein the at least one interface receives a message requesting to join a first multicast group from the subscriber device; and a control unit that determines an adaptive threshold value based on a number of multicast streams that the access node previously delivered simultaneously to the subscriber network, determines a projected stream count based on a current number of multicast streams currently being delivered to the subscriber network and a requested multicast stream associated with the join message, determining whether the projected stream count exceeds the adaptive threshold value, and identifies one of the multicast streams currently being delivered to the subscriber network for which a leave message requesting to leave a second multicast group corresponding to this one of the multicast streams was not received by the access node based on the determination of whether the projected stream count exceeds the adaptive threshold value.

14. The access node of claim 13, wherein the control unit further calculates a moving average of the number of multicast streams that the access node previously delivered simultaneously to the subscriber network, and sets the adaptive threshold value to the calculated moving average.

15. The access node of claim 13, wherein the control unit further determines a maximum number from the number of multicast streams the access node previously delivered simultaneously to the subscriber device, and sets the adaptive threshold value to the determined maximum number.

16. The access node of claim 13, wherein the control unit includes a multicast management protocol module that periodically generates a general query message in accordance with a multicast management protocol to query the subscriber network to determine those multicast groups to which the subscriber network subscribes to at the time of the general query, wherein the at least one interface forwards the general query to subscriber network and receives, in response to the general query message, a response message from the subscriber network indicating the multicast groups to which the subscriber network subscribes at the time of each general query in accordance with the multicast management protocol, and wherein the multicast management protocol module stores, for each of the periodic general queries, data defining the number of the multicast groups to which the subscriber network subscribes at the time of the general query and determines the adaptive threshold value based on an analysis of the data stored for each of the general queries defining the number of the multicast groups to which the subscriber network subscribes at the time of the general query.

17. The access node of claim 16, wherein the multicast management protocol comprises an Internet Group Management Protocol (IGMP).

18. The access node of claim 13, wherein the control unit further determines whether the current number is less than or equal to a minimum value before determining whether the projected stream count exceeds the adaptive threshold value and admits the subscriber device in response to determining that the current number of multicast streams is less than or equal to the minimum value without determining whether the projected stream count exceeds the adaptive threshold value.

19. The access node of claim 13, wherein the control unit further determines whether another subscriber device of the subscriber network is currently subscribed to the requested multicast group before determining whether the projected stream count exceeds the adaptive threshold value, and admits the subscriber device in response to determining that the other subscriber device of the subscriber network is currently subscribed to the requested multicast group without determining whether the projected stream count exceeds the adaptive threshold value.

20. The access node of claim 13, wherein the at least one interface delivers the multicast streams for a first set of multicast groups to the subscriber network, and wherein the control unit determines that the projected stream count exceeds the adaptive threshold value and, in response to the determination that the current number plus the additional multicast stream exceeds the adaptive threshold value, generates a general query message in accordance with a multicast management protocol to query the subscriber network to determine those of the multicast groups to which the subscriber network currently subscribes, wherein the at least one interface receives, in response to the general query message, a response message from the subscriber network indicating a second set of multicast groups to which the subscriber network currently subscribes in accordance with the multicast management protocol, and wherein the control unit further determines whether the first set of multicast groups is the same as the second set of multicast groups to identify the one of the multicast streams currently being delivered to the subscriber network for which the leave message requesting the leave a corresponding one of the first set of multicast groups was not received by the access node.

21. The access node of claim 20, wherein the control unit further removes, based on the determination of whether the first set is the same as the second set, one or more of the first set of multicast groups to generate a revised first set of multicast groups and updating the current number of multicast streams to equal a number of the revised first set of multicast groups, and wherein the at least one interface delivers the multicast streams for the revised set of multicast groups to the subscriber network.

22. The access node of claim 13, wherein the control unit includes a bandwidth monitoring module that stores data that specifies a bandwidth service limit, wherein the bandwidth service limit defines a limit to an amount of service data that the access node delivers to the subscriber network, wherein the service data includes data corresponding to the multicast streams currently being delivered to the subscriber network, determines a current amount of bandwidth consumed by the service data currently being delivered to the access node, determines a projected amount of bandwidth consumed upon delivering the multimedia content for the requested multimedia group to the subscriber device, compares the total of the current amount plus the projected amount to the bandwidth service limit, and admits the subscriber device to the multicast group based on the comparison.

23. The access node of claim 13, wherein the control unit further stores data that specifies a stream count limit, wherein the stream count limit defines a limit on a number of the multicast streams that the access node currently delivers to the subscriber network, compares the projected stream count to the stream count limit, and admits the subscriber device to the multicast group based on the comparison.

24. The access node of claim 13, wherein the control unit admits the subscriber device to the multicast group and updates, in response to admitting the subscriber device to the multicast group, the current number of multicast streams currently being delivered by the access node to the subscriber network to increase the current number by one, and wherein the at least one interface delivers a new multicast stream to the subscriber network in response to admitting the subscriber device to the multicast group.

25. The access node of claim 13, wherein the join message conforms to an Internet Group Management Protocol (IGMP), wherein the access node comprises one of a Digital Subscriber Line Access Multiplexer (DSLAM), a Cable Modem Termination System (CMTS), or a Optical Line Terminal (OLT), and wherein each of the number of multicast streams comprise a multicast stream for a different channel of an Internet Protocol Television (IPTV) service.

26. A system comprising:

a subscriber network that includes a subscriber device;

a network device;

an access node intermediately positioned between the subscriber network and the network device, wherein the access node includes:

at least one interface that couples the access node to the subscriber network, wherein the at least one interface receives a message requesting to join a first multicast group from the subscriber device; and a control unit that determines an adaptive threshold value based on a number of multicast streams that the access node previously delivered simultaneously to the subscriber network, determines a projected stream count based on a current number of multicast streams currently being delivered to the subscriber network and a requested multicast stream associated with the join message, determining whether the projected stream count exceeds the adaptive threshold value, and identifies one of the multicast streams currently being delivered to the subscriber network for which a leave message requesting to leave a second multicast group corresponding to this one of the multicast streams was not received by the access node based on the determination of whether the projected stream count exceeds the adaptive threshold value.

27. A non-transitory computer-readable medium comprising instructions for causing a programmable processor to:

determine an adaptive threshold value based on a number of multicast streams that an access node previously delivered simultaneously to a subscriber network that includes a subscriber device;

receive a message requesting to join a first multicast group from the subscriber device;

determine a projected stream count based on a current number of multicast streams currently being delivered to the subscriber network and a requested multicast stream associated with the join message;

determine whether the projected stream count exceeds the adaptive threshold value; and identify one of the multicast streams currently being delivered to the subscriber network for which a leave message requesting to leave a second multicast group corresponding to this one of the multicast streams was not received by the access node based on the determination of whether the projected stream count exceeds the adaptive threshold value.

* * * * *